(12) United States Patent
Ofir et al.

(10) Patent No.: US 9,451,419 B2
(45) Date of Patent: Sep. 20, 2016

(54) METHOD AND SYSTEM FOR SEAMLESSLY SWITCHING BETWEEN A TRUNKED MODE OPERATION AND A DIRECT MODE OPERATION

(71) Applicant: MOTOROLA SOLUTIONS, INC, Schaumburg, IL (US)

(72) Inventors: Gabi Ofir, Reshon Letzion (IL); Baruh Hason, Tel Aviv-Yaffo (IL); Salomon Serfaty, Gaash (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 253 days.

(21) Appl. No.: 13/950,356

(22) Filed: Jul. 25, 2013

(65) Prior Publication Data

US 2015/0031405 A1 Jan. 29, 2015

(51) Int. Cl.
*H04B 5/00* (2006.01)
*H04W 4/00* (2009.01)
(Continued)

(52) U.S. Cl.
CPC .............. *H04W 4/08* (2013.01); *H04W 36/36* (2013.01); *H04W 36/0072* (2013.01); *H04W 84/08* (2013.01); *H04W 88/04* (2013.01)

(58) Field of Classification Search
CPC ............ H04B 1/0071; H04B 7/15557; H04B 7/2606; H04B 7/2681; H04W 24/00; H04W 56/0015; H04W 74/04; H04W 76/023; H04W 76/02; H04W 84/047; H04W 84/08; H04W 84/12; H04W 92/02; H04W 92/18; H04W 4/008; H04W 4/08; H04W 8/186; H04W 24/02; H04W 36/0011; H04W 36/0016; H04W 36/0055; H04W 36/0066; H04W 36/165; H04W 36/22; H04W 36/36; H04W 72/0453; H04W 74/02; H04W 76/043; H04W 4/005; H04W 4/10; H04W 72/0406; H04W 72/042; H04W 72/085

USPC ......... 455/9, 11.1, 41.2, 436, 517, 518, 519; 370/241, 331, 337, 338; 375/340
See application file for complete search history.

(56) References Cited

U.S. PATENT DOCUMENTS 5,943,326 A * 8/1999 Schroderus ................... 370/324
5,960,360 A * 9/1999 Carmon ................ H04W 76/02
370/347

(Continued)

FOREIGN PATENT DOCUMENTS

EP 1538854 A2 6/2005
EP 1545148 A2 6/2005

(Continued)

OTHER PUBLICATIONS

PCT International Search Report and Written Opinion mailed Nov. 17, 2014 counterpart to PCT/US2014/046359.

*Primary Examiner* — Yuwen Pan
*Assistant Examiner* — Paul P Tran
(74) *Attorney, Agent, or Firm* — Daniel R. Bestor

(57) ABSTRACT

A method and a system for operating a subscriber unit to seamlessly switch between a trunked mode operation (TMO) and a direct mode operation (DMO) in a communication system. The communication system includes one or more subscriber units communicating in trunked mode operation on a first communication channel via a base station and the subscriber units communicating in direct mode operation on a second communication channel via a direct mode gateway station. When the subscriber units communicate in the TMO and when the signal quality on the first communication channel is below the predetermined threshold, the subscriber units automatically switch to the direct mode operation. When the subscriber units communicate in DMO and when the signal quality on the second communication channel is below the predetermined threshold, the subscriber units automatically switch to the trunked mode operation.

20 Claims, 7 Drawing Sheets

(51) Int. Cl.
*H04W 72/00* (2009.01)
*H04L 12/413* (2006.01)
*H04B 1/00* (2006.01)
*G06F 15/16* (2006.01)
*H04W 4/08* (2009.01)
*H04W 36/36* (2009.01)
*H04W 36/00* (2009.01)
*H04W 84/08* (2009.01)
*H04W 88/04* (2009.01)

(56) References Cited

U.S. PATENT DOCUMENTS

| | | |
|---|---|---|
| 7,127,265 B2 | 10/2006 | Kantola |
| 8,270,390 B2 | 9/2012 | Konaka |
| 2008/0009308 A1* | 1/2008 | Bar et al. .................. 455/550.1 |
| 2011/0117907 A1* | 5/2011 | Hooli .................... H04W 72/02 455/422.1 |
| 2011/0159874 A1 | 6/2011 | Ningawa |
| 2013/0156134 A1 | 6/2013 | Galan |
| 2015/0245397 A1* | 8/2015 | Sachs .................. H04W 76/023 455/426.1 |
| 2015/0319796 A1* | 11/2015 | Lu ........................ H04B 7/2615 370/330 |

FOREIGN PATENT DOCUMENTS

| | | |
|---|---|---|
| EP | 1413156 B1 | 11/2008 |
| GB | 2320161 A | 6/1998 |
| WO | 98/06228 A2 | 2/1998 |
| WO | 9806228 A2 | 2/1998 |
| WO | 0122755 A1 | 3/2001 |
| WO | 2010/005348 A1 | 1/2010 |
| WO | 2010005348 A1 | 1/2010 |

* cited by examiner

METHOD AND SYSTEM FOR SEAMLESSLY SWITCHING BETWEEN A TRUNKED MODE OPERATION AND A DIRECT MODE OPERATION

FIELD OF THE DISCLOSURE

The present disclosure relates generally to communication systems and more particularly to a method and a system for operating a subscriber unit to seamlessly switch between a trunked mode operation and a direct mode operation.

BACKGROUND OF THE INVENTION

According to TErrestrial Trunked Radio (TETRA) standard, different modes of operating a subscriber unit in a communication system are known. Such modes of operation include, but are not limited to, a trunked mode operation (TMO) and a direct mode operation (DMO). In the TMO, subscriber units use network infrastructure, such as base stations, to communicate with each other. In the DMO, on the other hand, subscriber units communicate directly with other subscriber units within a limited coverage area, without using the network infrastructure. The DMO may be utilized to provide coverage in areas where the TMO network is not available. The DMO may be used within the coverage area of the TMO network, if a group of users wishes to communicate only internally and does not wish that the group communication is audible to all others communicating in the TMO network.

TMO systems generally provide improved geographic coverage and signal strength compared to a DMO system. However, there are several problems that can occur in systems communicating in a TMO only network. For example, the communications may be weak at the edges of the TMO network's coverage area or at the areas outside the TMO network's coverage area. As such, communication in TMO cannot be maintained when the subscriber unit, communicating in TMO, moves out of the coverage area of the TMO network, for example indoors, underground, rural, or in other circumstances with poor coverage. But, this is undesirable in situations where connections should always be maintained at all times. One such situation is an emergency situation where front line fire fighters are employed to respond to an incident in a building. The front line fire fighters may experience coverage issues when the TMO network is not available or when the front line fire fighters move out of the TMO network's coverage area. However, it is very important that the front line fire fighters always stay connected to their talk group at all times. So, it is desirable to extend the coverage of the TMO network such that the subscriber unit is able to continue to communicate even when the subscriber unit moves out of the coverage area of the TMO network.

Moreover, it is also desirable that the users do not have to manually intervene, turn knobs, press key buttons etc. to continue the communication. This is not convenient for some users such as fully equipped fire workers who do not want to bother themselves with the subscriber units during operation.

Accordingly, there is a need to provide improved communications services and to ensure that communications are not affected when a subscriber unit moves out of the coverage area of a TMO network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
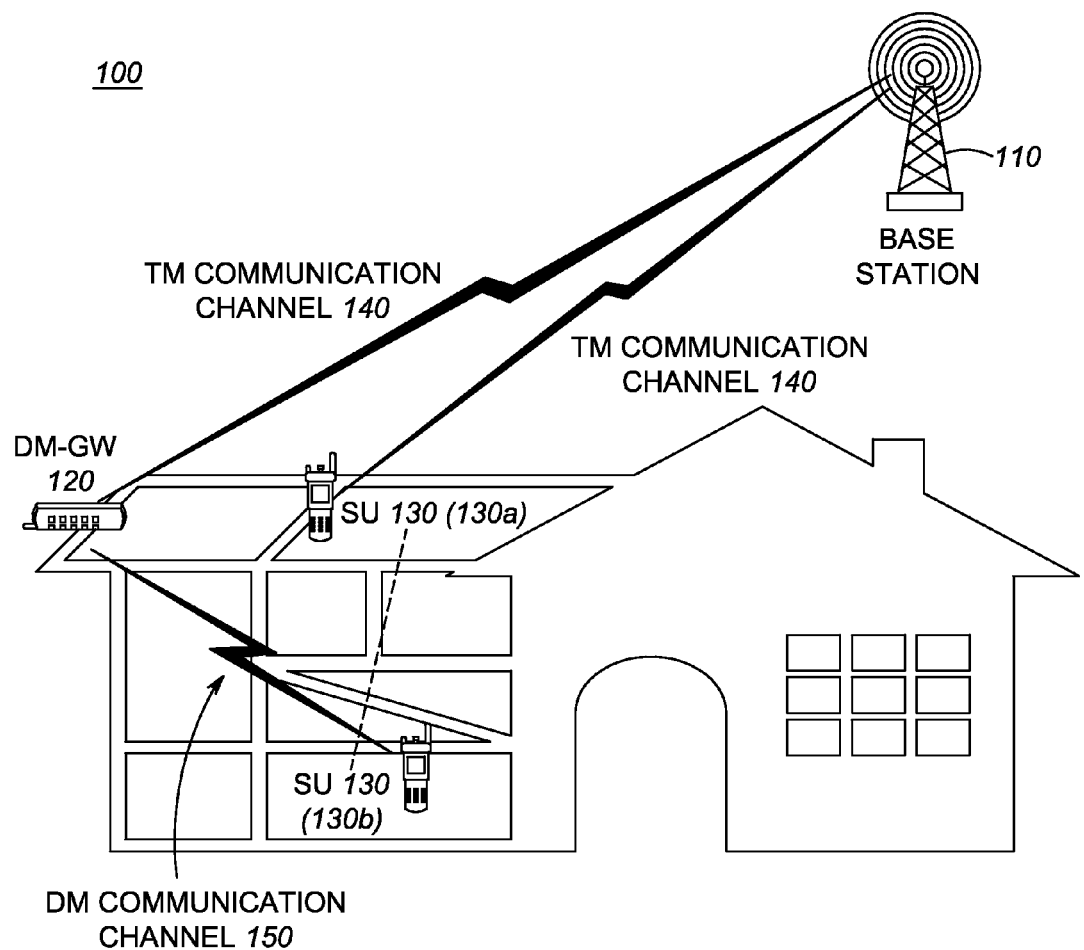
FIG. 1 is a block diagram of a communication system in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

A method and a system for operating a subscriber unit to seamlessly switch between a trunked mode operation (TMO) and a direct mode operation (DMO), and vice versa, in a communication system are provided herein. The communication system includes one or more subscriber units, a base station for providing trunked mode communications between the subscriber units operating in TMO using a first communication channel, and a direct mode gateway (DM-GW) station for providing direct mode communications between the subscriber units operating in DMO using a second communication channel. In operation, the direct mode gateway station is configured to relay communications between the first communication channel and the second communication channel. When the subscriber units communicate using the first communication channel in the TMO, the subscriber units determine whether the signal quality on the first communication channel is below a predetermined threshold, and in response to determining that the signal quality on the first communication channel is below the predetermined threshold, the subscriber units use the attributes associated with the second communication channel to automatically switch to the DMO for communicating on the second communication channel. When the subscriber units communicate using the second communication channel in the DMO, the subscriber units determine whether the signal quality on the second communication channel is below a predetermined threshold, and in response to determining that the signal quality on the second communication channel is below the predetermined threshold, the subscriber units use the attributes associated with the first communication channel to automatically switch to the TMO for communicating on the first communication channel.

FIG. 1 is a block diagram illustrating a communication system 100 in accordance with an embodiment of the present disclosure. In one embodiment, the communication system 100 is a TETRA communication system. The communication system 100 comprises a base station 110, a direct mode gateway (DM-GW) station 120, and one or more subscriber units 130. In one embodiment of the present disclosure, the base station 110 may be replaced with any other suitable network infrastructure device that can receive information in a signal from a subscriber unit 130 and transmit information in signals to one or more other subscriber units via one or more wireless communication links. Suitable network infrastructure devices include, but are not limited to, repeaters, base transceiver stations, access points, routers, servers, or other types of infrastructure equipment interfacing a wireless communication device or a subscriber unit 130 in a wireless environment. In one embodiment of the present disclosure, the subscriber unit 130 includes, but is not limited to, devices that are commonly referred to as access terminals, mobile radios, mobile stations, wireless communication devices, user equipments, mobile devices, or any other devices capable of operating in a wireless environment. Examples of subscriber unit 130 include, but are not limited to, two-way radios, mobile phones, cellular phones, personal digital assistants, laptops, and pagers. In one embodiment, the direct mode gateway (DM-GW) station 120 includes, but is not limited to, devices that are commonly referred to as access terminals, mobile radios, mobile stations, repeaters, gateway devices, routers, gateway terminals, or other types of communication devices interfacing a wireless communication device or a subscriber unit 130 in a wireless environment.

In accordance with an embodiment of the present disclosure, the base station 110 transmits and receives communications to and from subscriber units 130. The DM-GW station 120 relays communications between the base station 110 and the subscriber units 130 to allow the subscriber units 130 operating outside the coverage area of the base station 110 to send and receive communications with other subscriber units (not shown) that are within the coverage of the base station 110. Further, it is to be understood that the communication system 100 is only a logical representation of connections between a base station 110, a direct mode gateway (DM-GW) station 120, and one or more subscriber units 130, and thus the communication system 100 may otherwise include multiple base stations and multiple direct mode gateway stations, each such base station and each such direct mode gateway station serving one or more subscriber units 130.

In the embodiments of the present disclosure, the communication system 100 provides different modes of operation for the subscriber units 130. The modes of operation include a TMO and a DMO. In TMO, the subscriber unit 130, at a location 130a, communicates with at least one other subscriber unit (not shown, but reachable via one of a direct mode communication channel 150 and a trunked mode communication channel 140) through the base station 110 on a trunked mode communication channel 140 associated with the base station 110. For example, the subscriber unit 130 may be involved in a group call (talk group) or a private call with one or more other subscriber units via the base station 110. In DMO, the subscriber unit 130, at a location 130b, communicates with at least one other subscriber unit (not shown, but reachable via one of a direct mode communication channel 150 and a trunked mode communication channel 140) through the DM-GW station 120 on a direct mode communication channel 150 associated with the DM-GW station 120. The DM-GW station 120 is located and positioned such that it can receive signals with sufficient signal strength from the base station 110 (also referred to as trunked network in the disclosure) and can transmit signals with comparatively improved signal strength in an area where the trunked network is limited or not accessible. The direct mode communication channel 150 associated with DM-GW station 120 is always available regardless of the presence of any subscriber unit operating on the direct mode communication channel 150. In one embodiment of the present disclosure, a subscriber unit can also operate as a DM-GW station 120 in addition to its normal function as a subscriber unit in the communication system 100. In this case, the subscriber unit notifies the communication system 100 of its gateway capabilities when the subscriber unit needs to operate as a DM-GW station 120. In one embodiment, the subscriber unit 130, in DMO, can communicate directly with other subscriber units (not shown) without communicating through the DM-GW station 120. In the embodiments of the present disclosure, the trunked mode communication channel 140 (also referred to as first communication channel) and the direct mode communication channel 150 (also referred to as second communication channel) represent non-tangible communication resources, e.g., radio frequency (RF) resources, over which the subscriber units 130 communicate.

In the TMO, the communications on the trunked mode communication channel 140 via the base station 110 include, but are not limited to, voice communication, data communication, or a combination thereof. In the embodiments of the present disclosure, when the subscriber unit 130 is communicating on the trunked mode communication channel 140 through the base station 110 in the TMO, the DM-GW station 120 time-aligns the direct mode communication channel 150 with the trunked mode communication channel 140. The time alignment between the trunked mode communication channel 140 and direct mode communication channel 150 is achieved by enforcing the timing of the trunked mode communication channel 140 on the timing of the direct mode communication channel 150. In this embodiment, the timing of the direct mode communication channel 150 is established from the existing timing of the trunked mode communication channel 140. When the trunked mode communication channel 140 and the direct mode communication channel 150 are time-aligned, they are controlled by similar sets of timers and counters that is the timing/duration of the timers and the counters in both, TMO and DMO are the same (for example same symbol time/duration, same slot time/duration, and same frame time/duration) and all the timers and the counters in the TMO and the DMO start and end at the same time. The system engineer, who deploys the TMO and the DMO, deploys similar timers and counters having similar values with considerations to specific conditions in each network, like topography, system load, queued services etc.

In one embodiment, after the time alignment between the trunked mode communication channel 140 and the direct mode communication channel 150 is achieved, the DM-GW station 120 transmits presence signal synchronization burst signals to the subscriber unit 130 to synchronize the subscriber unit 130 with the direct mode communication channel 150. The DM-GW station 120 transmits the presence signal synchronization burst signals on the direct mode communication channel 150, for example, in the second and the fourth slots of the four-slot trunked mode communication channel 140. The first and the third slots are used by the subscriber unit 130 to communicate on the trunked mode communication channel 140. In idle times, that is when not engaged in any service, the DM-GW station 120 transmits the presence signal synchronization burst signals on the direct mode communication channel 150 continuously, in all four available slots. The subscriber unit 130 uses the presence signal synchronization burst signals to synchronize the trunked mode communication channel 140 and the direct mode communication channel 150 when the subscriber unit 130 switches to the DMO. The presence signal synchronization burst signals include, but are not limited to, a signal carrying synchronization information, identity of the talkgroup associated with the DM-GW station 120, identity of the network serving the DM-GW station 120, encryption parameters used by the DM-GW station 120, power class of the DM-GW station 120, channel state (idle or in service) of a channel associated with the DM-GW station 120, services available with the DM-GW station 120, counter values of the trunked mode communication channel 140. In this embodiment of the present disclosure, when the subscriber unit 130 switches from the TMO to the DMO, since the direct mode communication channel 150 is time-aligned to the trunked mode communication channel 140 by the DM-GW station 120, the subscriber unit 130 can use the same timing of the trunked mode communication channel 140 on the direct mode communication channel 150. The subscriber unit 130 need not wait for the presence signal synchronization burst signal on the direct mode communication channel 150 after moving to the direct mode communication channel 150. In this way, the subscriber unit 130 is pre-configured to continue or start communicating using the DM-GW station 120 in the DMO immediately after switching to the direct mode communication channel 150.

The time alignment and the synchronization of the trunked mode communication channel 140 and the direct mode communication channel 150 enable the DM-GW station 120 to relay the communication of the trunked mode communication channel 140 on the direct mode communication channel 150 in an ordered and predictable manner. In the embodiments of the present disclosure, after establishing the synchronization, the DM-GW station 120 relays the entire communication of the trunked mode communication channel 140 on the direct mode communication channel 150 associated with the DM-GW station 120. The communication of the trunked mode communication channel 140 is thus always made available on the direct mode communication channel 150 even when no subscriber unit is tuned or operating on the direct mode communication channel 150. In one embodiment of the present disclosure, a plurality of DM-GW stations associated with a particular talk group relay the communications of the trunked mode communication channel 140 on a direct mode communication channel respectively assigned to each of the plurality of DM-GW stations.

In accordance with the embodiments of the present disclosure, the subscriber unit 130 maintains attributes in the TMO for switching and operating in the DMO when the subscriber unit 130 moves out of the coverage area of the trunked network. In this case, the subscriber unit 130 maintains attributes associated with the direct mode communication channel 150 associated with the DM-GW station 120 when the subscriber unit 130 operates in the TMO. In another embodiment of the present disclosure, the subscriber unit 130 maintains attributes associated with a plurality of direct mode communication channels when the subscriber unit 130 operates in the TMO.

In accordance with the embodiment of the present disclosure, when the subscriber unit 130 communicates using the base station 110 in TMO, the subscriber unit 130 monitors the signal quality of the communications on the trunked mode communication channel 140. Monitoring the signal quality comprises, but is not limited to, monitoring whether the subscriber unit 130 is in the coverage area of the trunked network or not and whether the subscriber unit 130 is able to transmit and receive the signals from the associated base station 110 with sufficient signal strength and is able to decode the signals appropriately. Next, the subscriber unit 130 determines whether the signal quality on the trunked mode communication channel 140 is below a predetermined threshold for a predetermined interval of time. The signal quality may be below a predetermined threshold when the subscriber unit 130 moves out of the coverage area of the trunked network. The subscriber unit 130 uses the attributes associated with the direct mode communication channel 150 to automatically switch to the DMO when the signal quality on the trunked mode communication channel 140 is below the predetermined threshold for a predetermined interval of time.

Now, the subscriber unit 130 operates in the DMO and communicates via the DM-GW station 120 on the direct mode communication channel 150. The communications on the direct mode communication channel 150 include, but are not limited to, voice communication, data communication, or a combination thereof. When the subscriber unit 130 is communicating on the direct mode communication channel 150 through the DM-GW station 120 in DMO, the base station 110 time-aligns and synchronizes the trunked mode communication channel 140 with the direct mode communication channel 150. The time alignment and the synchronization of the trunked mode communication channel 140 and the direct mode communication channel 150 enable the base station 110 to relay the communications of the direct mode communication channel 150 (provided to it via the DM-GW station 120) on the trunked mode communication channel 140. The communications of the direct mode communication channel 150 are thus always made available on the trunked mode communication channel 140, even when no subscriber unit is tuned or operating on the trunked mode communication channel 140. In the embodiment of the present disclosure, as soon as the subscriber unit 130 switches to the TMO, the subscriber unit 130 is able to communicate using the trunked mode communication channel 140 via the base station 110. The complete description of the DMO is omitted for brevity as the description of the DMO is analogous to the description of the TMO explained earlier.

In accordance with the embodiments of the present disclosure, the subscriber unit 130 maintains attributes in the DMO for switching and operating in the TMO when the subscriber unit 130 is not able to communicate in the DMO or when the subscriber unit moves into the coverage area of a trunked network. In this case, the subscriber unit 130 maintains attributes associated with the trunked mode communication channel 140 associated with the base station 110 when the subscriber unit 130 operates in the DMO. In another embodiment of the present disclosure, the subscriber unit 130 maintains attributes associated with a plurality of trunked mode communication channels associated with a plurality of base stations when the subscriber unit 130 operates in the DMO.

In accordance with the embodiments of the present disclosure, when the subscriber unit 130 communicates using the DM-GW station 120 in DMO, the subscriber unit 130 monitors the signal quality of the communications on the direct mode communication channel 150. Subsequently, the subscriber unit 130 determines whether the signal quality on the direct mode communication channel 150 is below a predetermined threshold for a predetermined interval of time. The signal quality may be below a predetermined threshold when the subscriber unit 130 is not able to communicate in the DMO or when the subscriber unit 130 moves out of the coverage area of the DM-GW station 120 in DMO. The subscriber unit 130 uses the attributes associated with the trunked mode communication channel 140 to automatically switch to the TMO for communicating on the trunked mode communication channel 140 via the base station 110 when the signal quality on the direct mode communication channel 150 is below the predetermined threshold for a predetermined interval of time.

In one embodiment of the present disclosure, the subscriber unit 130 operates as a dual watch capable radio. As used herein, the term "dual watch capable radio" defines a radio that is capable of monitoring and receiving communications from two different communication channels simultaneously. The dual watch capable radio operates in the TMO using the trunked mode communication channel 140 and DMO using the direct mode communication channel 150. In the communication system 100, the dual watch capable radio uses the first and the third slot of the four-slot time division multiple access (TDMA) channel for communication in TMO and the second and fourth slot for communication in DMO. The dual watch capable radio may choose to switch between the trunked mode communication channel 140 and the direct mode communication channel 150 to improve the communication by using its dual watch capabilities. When the dual watch capable radio is idle, it monitors both the trunked mode communication channel 140 and the direct mode communication channel 150. When the dual watch capable radio is communicating, for example, on trunked mode communication channel 140, the dual watch capable radio monitors the other communication channel, for example, the direct mode communication channel 150. In an alternative embodiment of the present disclosure, the dual watch capable radio comprises two transceivers, where a first transceiver is tuned to the trunked mode communication channel 140 for TMO and a second transceiver is either tuned to the direct mode communication channel 150 for DMO or used for scanning available direct mode communication channels. In one embodiment, the dual watch capable radio uses the information contained in the attributes received over the trunked mode communication channel 140 to identify the direct mode communication channels that are to be scanned.

Figure 2:
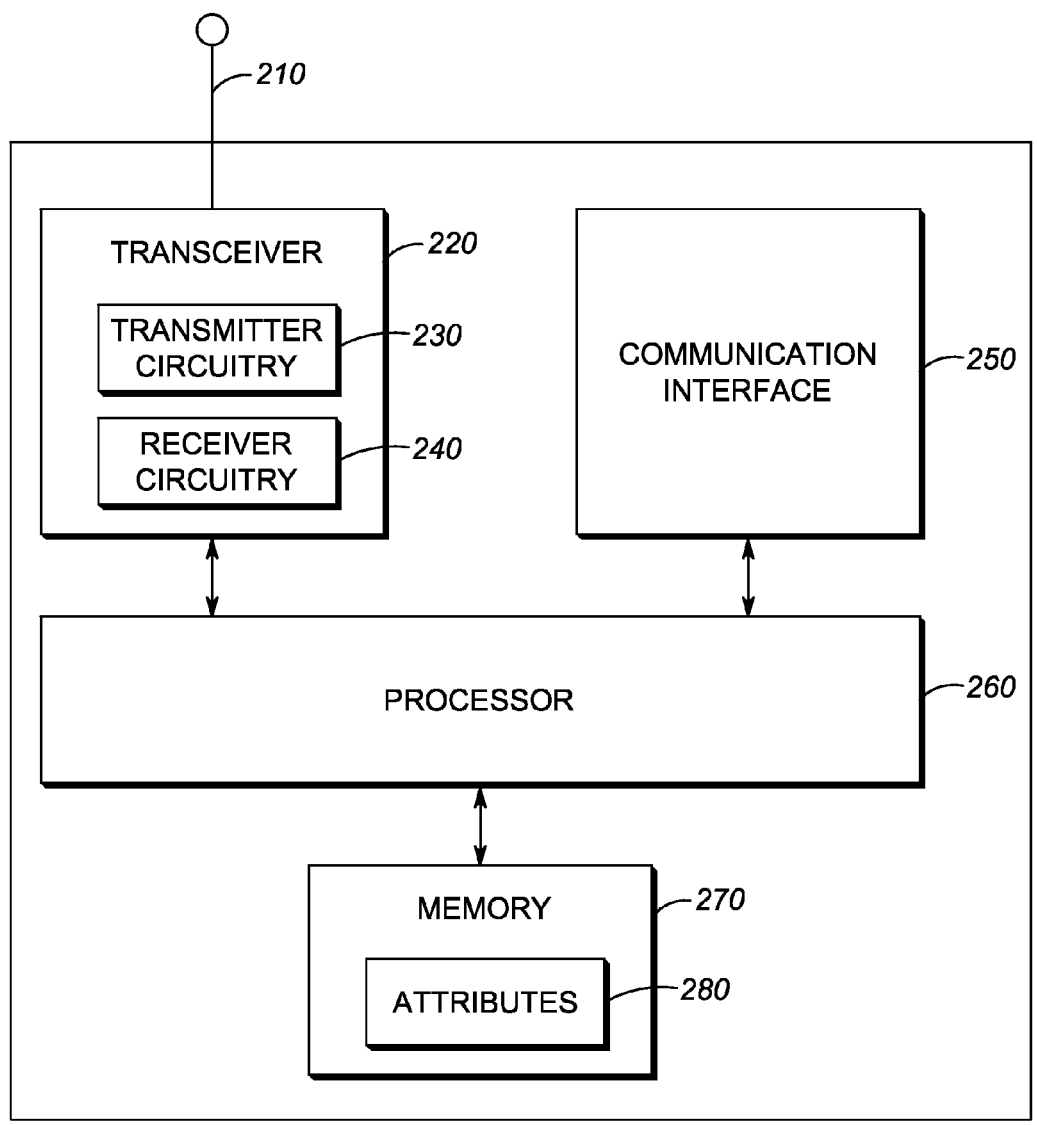
FIG. 2 is a block diagram of an example subscriber unit in accordance with an embodiment of the present disclosure.

FIG. 2 is a block diagram of an apparatus 200 for operation within the communication system 100 of FIG. 1 in accordance with the embodiments of the present disclosure. The apparatus 200, for example, is implemented in a subscriber unit 130 in the communication system 100. The apparatus 200 includes an antenna 210, a transceiver 220 including a transmitter circuitry 230 and a receiver circuitry 240, a communication interface 250, a processor 260, and a memory 270 for storing the attributes 280 associated with the trunked mode communication channel 140 and the direct mode communication channel 150. The apparatus 200 is an integrated unit containing at least all the elements depicted in FIG. 2, as well as any other elements necessary for the apparatus 200 for switching between the TMO and the DMO. Alternatively, the apparatus 200 can comprise a collection of appropriately interconnected units or devices, wherein such units or devices perform functions that are equivalent to the functions performed by the elements of the apparatus 200.

The antenna 210 comprises any known or developed structure for radiating and receiving RF signals in the trunked mode communication channel 140 and the direct mode communication channel 150 over which the transmitter circuitry 230 and the receiver circuitry 240 are used to communicate. The transmitter circuitry 230 and the receiver circuitry 240 enable the apparatus 200 to communicate radio signals to, and acquire radio signals from, other communication entities, for example, other subscriber units, base station 110, and DM-GW station 120. In this regard, the transmitter circuitry 230 and the receiver circuitry 240 include appropriate conventional circuitry to enable digital or analog transmissions over the trunked mode communication channel 140 and the direct mode communication channel 150. The transmitter circuitry 230 and the receiver circuitry 240 are implemented as part of the subscriber unit's 130 hardware and software architecture in accordance with known techniques. One of ordinary skill in the art will recognize that most, if not all, of the functions of the transmitter circuitry 230 and/or the receiver circuitry 240 can be implemented in a processor, such as the processor 260.

The receiver circuitry 240 is capable of receiving RF signals from at least the trunked mode communication channel 140 and the direct mode communication channel 150. The transmitter circuitry 230 and the receiver circuitry 240 together form the wireless transceiver 220 to enable bi-directional wireless communication between subscriber units 130. In accordance with the embodiments of the present disclosure, the wireless transceiver 220 is configured to communicate on the trunked mode communication channel 140 via the base station 110 in the TMO and on the direct mode communication channel 150 via the DM-GW station 120 in the DMO.

The communication interface 250 includes appropriate hardware and software architecture in accordance with known techniques that enable the subscriber unit 130 to communicate with other communication entities, for example, other subscriber units, base station 110, and DM-GW station 120. The processor 260 includes one or more microprocessors, microcontrollers, DSPs (digital signal processors), state machines, logic circuitry, or any other device or devices that process information based on operational or programming instructions. Such operational or programming instructions (not shown) are stored in the memory 270. The memory 270 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 260 has one or more of its functions performed by a state machine or logic circuitry, the memory 270 containing the corresponding operational instructions can be embedded within the state machine or logic circuitry. The memory 270 is operated to store and maintain attributes 280 associated with the trunked mode communication channel 140 and the direct mode communication channel 150. Additionally, the memory 270 may store code component that, when executed by processor 260, performs one or more of the functions, steps, message transmissions, and message receptions as set forth in FIGS. 3-7.

In accordance with the embodiment of the present disclosure, the memory maintains attributes 280 associated with the direct mode communication channel 150 in the TMO for switching and operating in the DMO when the subscriber unit 130 moves out of the coverage area of the trunked network. In one embodiment of the present disclosure, the attributes 280 are pre-configured in the memory 270 of the subscriber unit 130. In an alternative embodiment of the present disclosure, the subscriber unit 130 periodically receives, via the transceiver 220, the attributes 280 from the DM-GW station 120 and further stores the attributes 280 in the memory 270. In the TMO, the subscriber unit 130 receives the attributes 280 associated with the direct mode communication channel 150 associated with the DM-GW station 120 over the trunked mode communication channel 140 from the DM-GW station 120. The attributes 280 associated with the direct mode communication channel 150 comprises parameters including information about one or more of a channel frequency, a frequency range to scan, a location of the DM-GW station 120 serving the direct mode communication channel 150, location of cells neighboring to the DM-GW station 120, number of subscriber units affiliated with the DM-GW station 120, a talk group with which the DM-GW station 120 is currently affiliated, signal quality parameters, and relevant timers and counters.

In accordance with the embodiment of the present disclosure, the memory 270 maintains attributes 280 associated with the trunked mode communication channel 140 in the DMO for switching and operating in the TMO when the subscriber unit 130 is not able to communicate in the DMO or when the subscriber unit 130 moves into the coverage area of a trunked network. In one embodiment of the present disclosure, the attributes 280 are pre-configured in the memory 270 of the subscriber unit 130. In an alternative embodiment of the present disclosure, the subscriber unit 130 periodically receives, via the transceiver 220, the attributes 280 from the DM-GW station 120. The subscriber unit 130 stores the attributes 280 in the memory 270. In the DMO, the subscriber unit 130 receives the attributes 280 associated with the trunked mode communication channel 140 associated with the base station 110 over the direct mode communication channel 150 from the DM-GW station 120. The attributes 280 associated with the trunked mode communication channel 140 comprises parameters including information about one or more of a channel frequency, a frequency range to scan, a location of the base station 110 serving the trunked mode communication channel 140, location of cells neighboring to the base station 110, number of subscriber units affiliated with the base station 110, a talk group with which the base station 110 is currently affiliated, signal quality parameters, and relevant timers and counters.

As illustrated in FIG. 2, the processor 260 is coupled to the wireless transceiver 220 and the memory 270 and the processor 260 is configured to determine, via the wireless transceiver 220, whether the signal quality of the communications received on the trunked mode communication channel 140 is below a predetermined threshold. The processor 260 is further configured to automatically switch the wireless transceiver 220 to the DMO for communicating on the direct mode communication channel 150 using the attributes associated with the direct mode communication channel 150 when the signal quality on the trunked mode communication channel 140 is below the predetermined threshold. The processor 260 is also configured to determine, via the wireless transceiver 220, whether the signal quality on the direct mode communication channel 150 is below a predetermined threshold. The processor 260 is further configured to automatically switch the wireless transceiver 220 to the TMO for communicating on the trunked mode communication channel 140 using the attributes 280 associated with the trunked mode communication channel 140 when the signal quality on the direct mode communication channel 150 is below the predetermined threshold.

Figure 3:
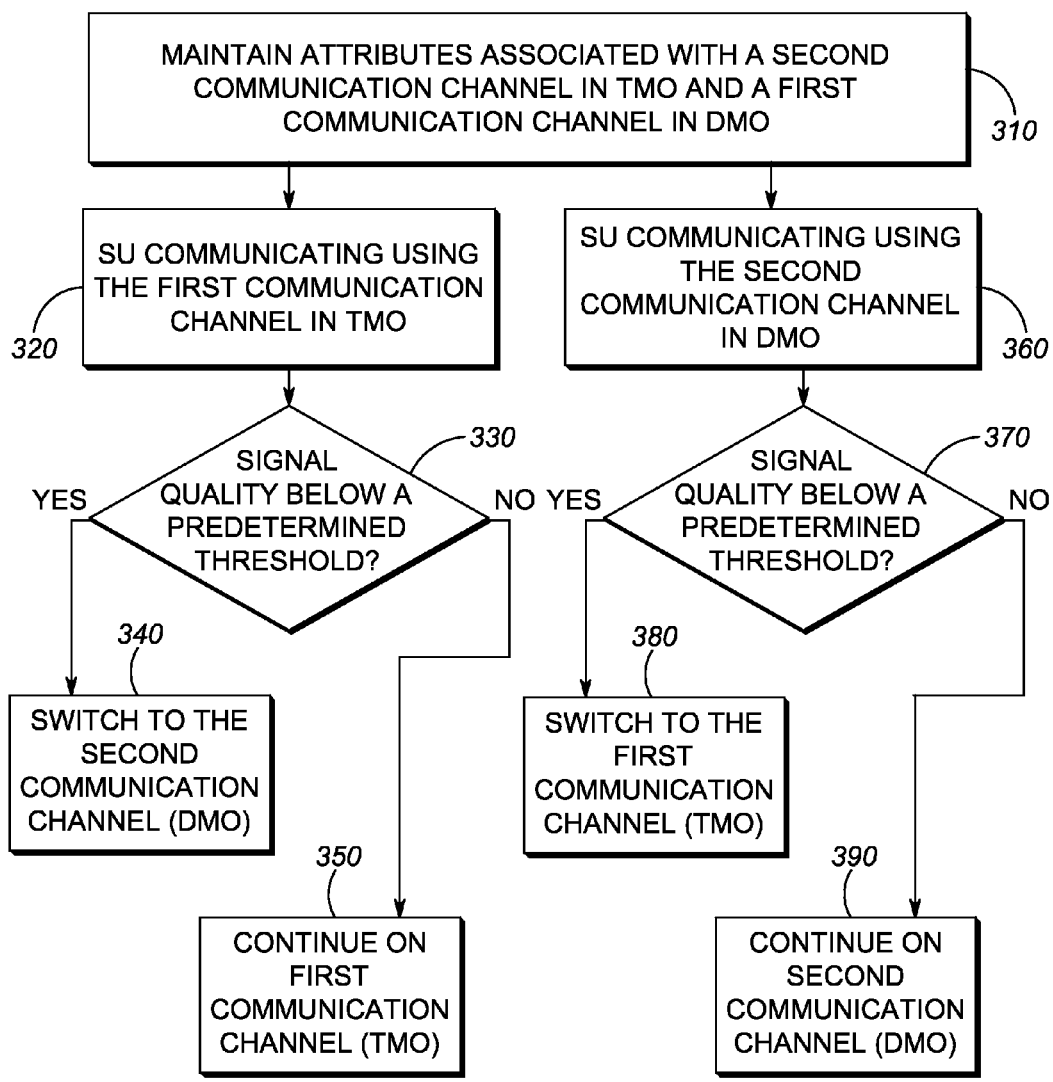
FIG. 3 is a flowchart illustrating a method of operation of a subscriber unit of FIG. 2 for seamlessly switching between TMO and DMO in accordance with an embodiment of the present disclosure.

FIG. 3 is a flowchart illustrating a method 300 of operation by an apparatus, such as the apparatus 200, that may be implemented, for example, in a subscriber unit such as the subscriber unit 130 for seamlessly switching between a trunked mode operation and a direct mode operation in the communication system 100 in accordance with an embodiment of the present disclosure. At block 310, the subscriber unit maintains attributes associated with the direct mode communication channel when the subscriber unit operates in the TMO and the subscriber unit maintains attributes associated with the trunked mode communication channel 140 when the subscriber unit operates in the DMO. At block 320, the subscriber unit communicates in TMO using the trunked mode communication channel. Next, at block 330, the subscriber unit determines whether the signal quality on the trunked mode communication channel is below a predetermined threshold. When the signal quality on the trunked mode communication channel is below the predetermined threshold, at block 340, the subscriber unit switches to the DMO for communicating on the direct mode communication channel using the attributes associated with the direct mode communication channel. For example, in the TMO, the subscriber unit may use the location of the DM-GW stations as one attribute for switching to the DMO, when the subscriber unit moves out of the coverage area of the trunked network. Based on the location of the DM-GW stations, the subscriber unit may determine the distance between the subscriber unit and the DM-GW stations. In this case, the subscriber unit may switch to the nearest DM-GW station for communicating on a direct mode communication channel associated with the selected DM-GW station in the DMO. When the signal quality on the trunked mode communication channel is not below the predetermined threshold, at block 350, the subscriber unit continues to communicate using the trunked mode communication channel in the TMO.

At block 360, the subscriber unit communicates using the direct mode communication channel in DMO. Next, at block 370, the subscriber unit determines whether the signal quality on the direct mode communication channel is below a predetermined threshold. When the signal quality on the direct mode communication channel is below the predetermined threshold, at block 380, the subscriber unit switches to the TMO for communicating on the trunked mode communication channel using the attributes associated with the trunked mode communication channel. For example, in the DMO, the subscriber unit may use the location of the base stations as one attribute for switching to the TMO, when the subscriber unit moves out of the coverage area of the DM-GW station. Based on the location of the base stations, the subscriber unit determines the distance between the subscriber unit and the base stations. In this case, the subscriber unit switches to the nearest base station for communicating on a trunked mode communication channel associated with the selected base station in the TMO. When the signal quality on the direct mode communication channel is not below the predetermined threshold, at block 390, the subscriber unit continues to communicate using the direct mode communication channel in the DMO.

Figure 4:
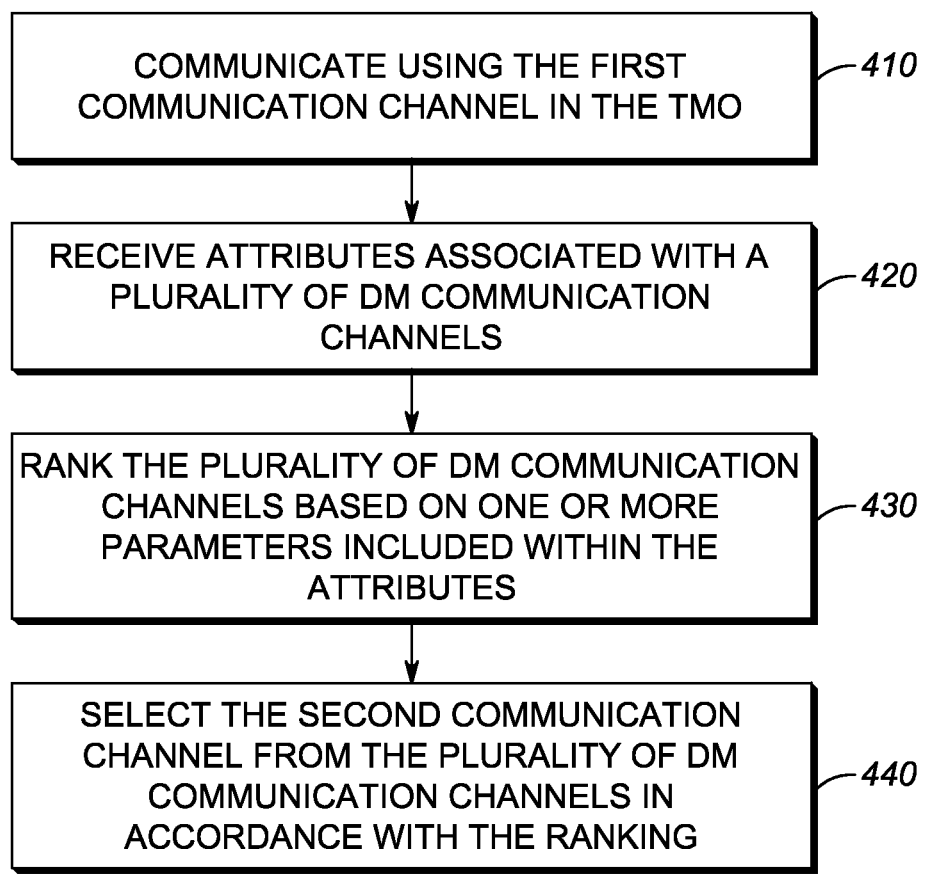
FIG. 4 is a flowchart illustrating a method of operation of a subscriber unit of FIG. 2 for communicating in TMO in accordance with an embodiment of the present disclosure.

FIG. 4 is a flowchart illustrating a method 400 of operating an apparatus, such as the apparatus 200 that may be implemented, for example, in a subscriber unit such as the subscriber unit 130 for communicating in a TMO in the communication system 100 in accordance with an embodiment of the present disclosure. At block 410, the subscriber unit communicates using the trunked mode communication channel in the TMO. At block 420, the subscriber unit receives attributes associated with a plurality of direct mode communication channels from a plurality of direct mode gateway stations associated with a particular talk group. The subscriber unit receives attributes associated with at least one direct mode communication channel from each direct mode gateway station. Each direct mode gateway station has at least one direct mode communication channel associated with it. At block 430, the subscriber unit ranks the plurality of direct mode communication channels based on one or more parameters or information included within the attributes received from the direct mode gateway stations. By ranking the direct mode communication channels, the subscriber unit determines a sequence in which the direct mode communication channels can be utilized when the subscriber unit moves out of the coverage area of the trunked network. At block 440, the subscriber unit selects the direct mode communication channel in accordance with the ranking. The subscriber unit automatically switches to the selected direct mode communication channel for communicating on the DMO when the signal quality on the trunked mode communication channel is below the predetermined threshold. When the subscriber unit is not able to switch to the selected direct mode communication channel, the subscriber unit switches to the next direct mode communication channel in the sequence in accordance with the ranking.

Figure 5:
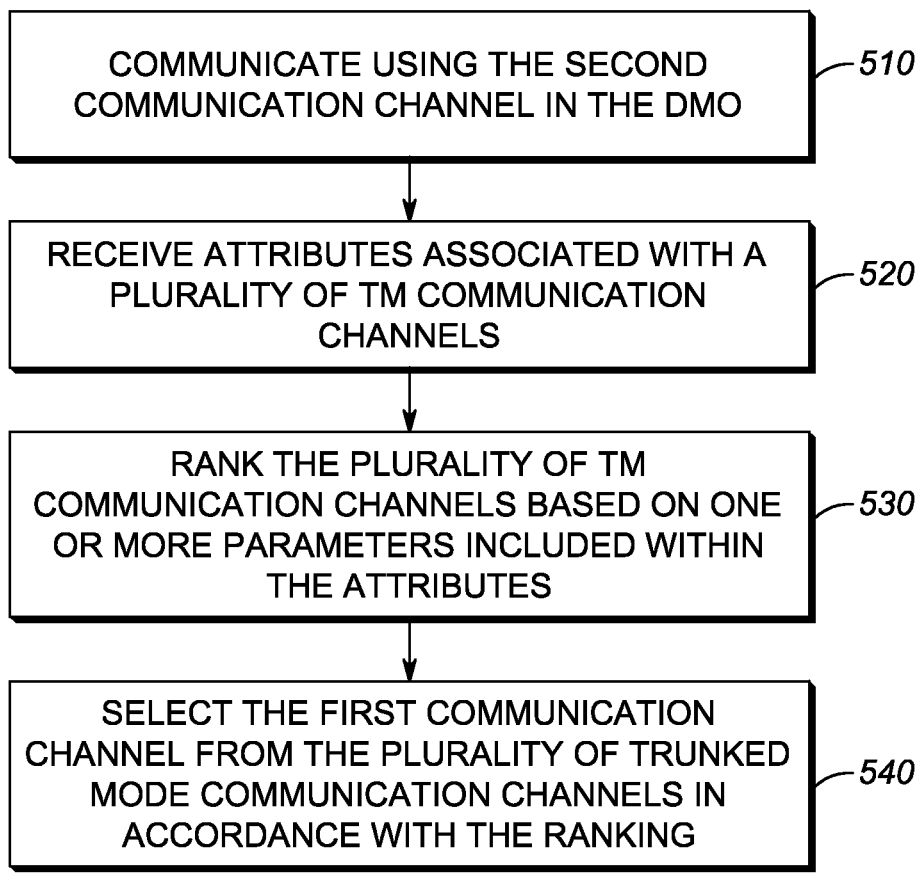
FIG. 5 is a flowchart illustrating a method of operation of a subscriber unit of FIG. 2 for communicating in DMO in accordance with an embodiment of the present disclosure.

FIG. 5 is a flowchart illustrating a method 500 of operating an apparatus, such as the apparatus 200 that may be implemented, for example, in a subscriber unit such as the subscriber unit 130 for communicating in a DMO in the communication system 100 in accordance with an embodiment of the present disclosure. At block 510, the subscriber unit communicates using the direct mode communication channel in the DMO. At block 520, the subscriber unit receives attributes associated with a plurality of trunked mode communication channels from a plurality of base stations associated with a particular talk group via the DM-GW station. The subscriber unit receives attributes associated with at least one trunked mode communication channel assigned to each base station from the DM-GW station. The DM-GW station receives the attributes associated with a plurality of trunked mode communication channels from the base stations. Each base station, associated with the particular talk group, has at least one trunked mode communication channel assigned to it. At block 530, the subscriber unit ranks the plurality of trunked mode communication channels based on one or more parameters or information included within the attributes received from the DM-GW station. By ranking the direct mode communication channels, the subscriber unit determines a sequence in which the trunked mode communication channels can be utilized when the subscriber unit is not able to communicate in the DMO or when the subscriber unit moves into the coverage area of a trunked network. At block 540, the subscriber unit selects the trunked mode communication channel in accordance with the ranking. The subscriber unit automatically switches to the selected trunked mode communication channel for communicating on the TMO when the signal quality on the direct mode communication channel is below the predetermined threshold. When the subscriber unit is not able to switch to the selected trunked mode communication channel, the subscriber unit switches to the next trunked mode communication channel in the sequence in accordance with the ranking.

Figure 6:
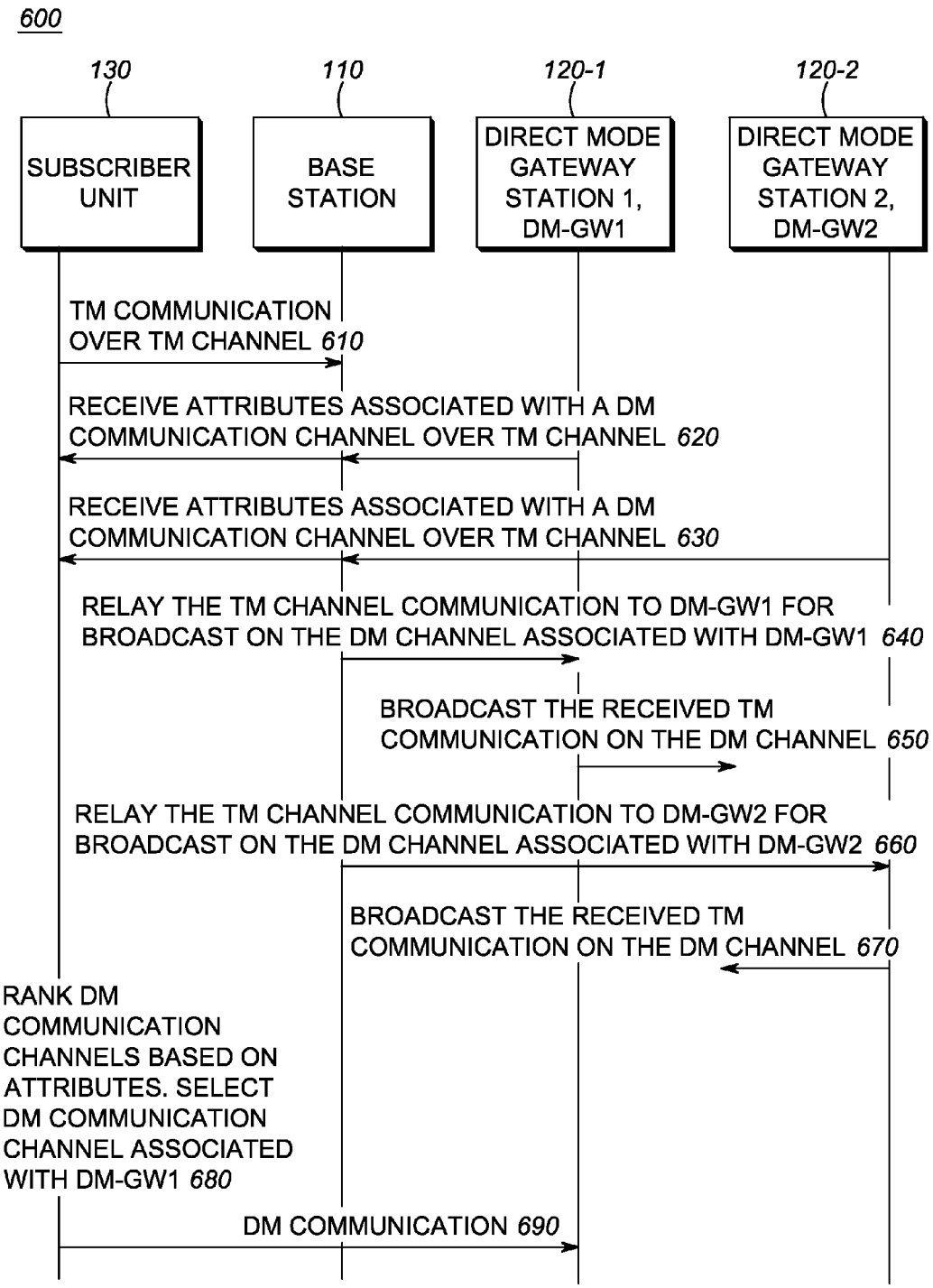
FIG. 6 illustrates an operation in the communication system of FIG. 1 for seamlessly switching from the TMO to the DMO in accordance with an embodiment of the present disclosure.

FIG. 6 illustrates a method 600 of operation in the communication system 100 of FIG. 1 for seamlessly switching from the TMO to the DMO in accordance with an embodiment of the present disclosure. FIG. 6 shows two direct mode gateway stations, DM-GW1 120-1 and DM-GW2 120-2 for purposes of explaining a specific embodiment of the present disclosure. However, the scope of the present disclosure is not limited to two direct mode gateway stations and there may be more or less number of direct mode gateway stations in various embodiments of the present disclosure. At step 610, the subscriber unit 130 communicates using the trunked mode communication channel 140 in the TMO via the base station 110. At step 620, the subscriber unit 130 receives attributes associated with a first direct mode communication channel from the DM-GW1 120-1 over the trunked mode communication channel 140 through the base station 110. At step 630, the subscriber unit 130 receives attributes associated with a second direct mode communication channel from the DM-GW2 120-2 over the trunked mode communication channel 140 through the base station 110. In the embodiments of the present disclosure, the subscriber unit 130 also receives presence signal synchronization burst signals from the DM-GW stations. The subscriber unit 130 uses the presence signal synchronization burst signals to synchronize the trunked mode communication channel 140 and the direct mode communication channel 150 when the subscriber unit 130 switches to the DMO. At step 640, the base station 110 relays the communication of the trunked mode communication channel 140 to the DM-GW1 120-1 for the DM-GW1 120-1 to broadcast the communication on the first direct mode communication channel. At step 650, the DM-GW1 120-1 broadcasts the received communication on the first direct mode communication channel. At step 660, the base station 110 relays the communication of the trunked mode communication channel 140 to the DM-GW2 120-2 for the DM-GW2 120-2 to broadcast the communication on the second direct mode communication channel. At step 670, the DM-GW2 120-2 broadcasts the received communication on the second direct mode communication channel. While FIG. 6 implies a time delay between the transmissions 640 and 660, in some embodiments, these transmissions may occur substantially simultaneously, and/or may occur in an opposite order than that illustrated in FIG. 6. The same holds true for subsequent steps 650 and 670.

At step 680, the subscriber unit 130 ranks the first and the second direct mode communication channels based on one or more parameters or information included within the attributes received from the DM-GW1 120-1 and DM-GW2 120-2. Also at step 680, the subscriber unit 130 selects the first direct mode communication channel associated with the DM-GW1 120-1 in accordance with the ranking. In another embodiment of the present disclosure, the subscriber unit 130 selects the second direct mode communication channel associated with the DM-GW2 120-2 in accordance with the ranking. When the signal quality on the trunked mode communication channel 140 is below the predetermined threshold, the subscriber unit 130 automatically switches to the DMO for communicating on the selected first direct mode communication channel via the DM-GW1 120-1.

Figure 7:
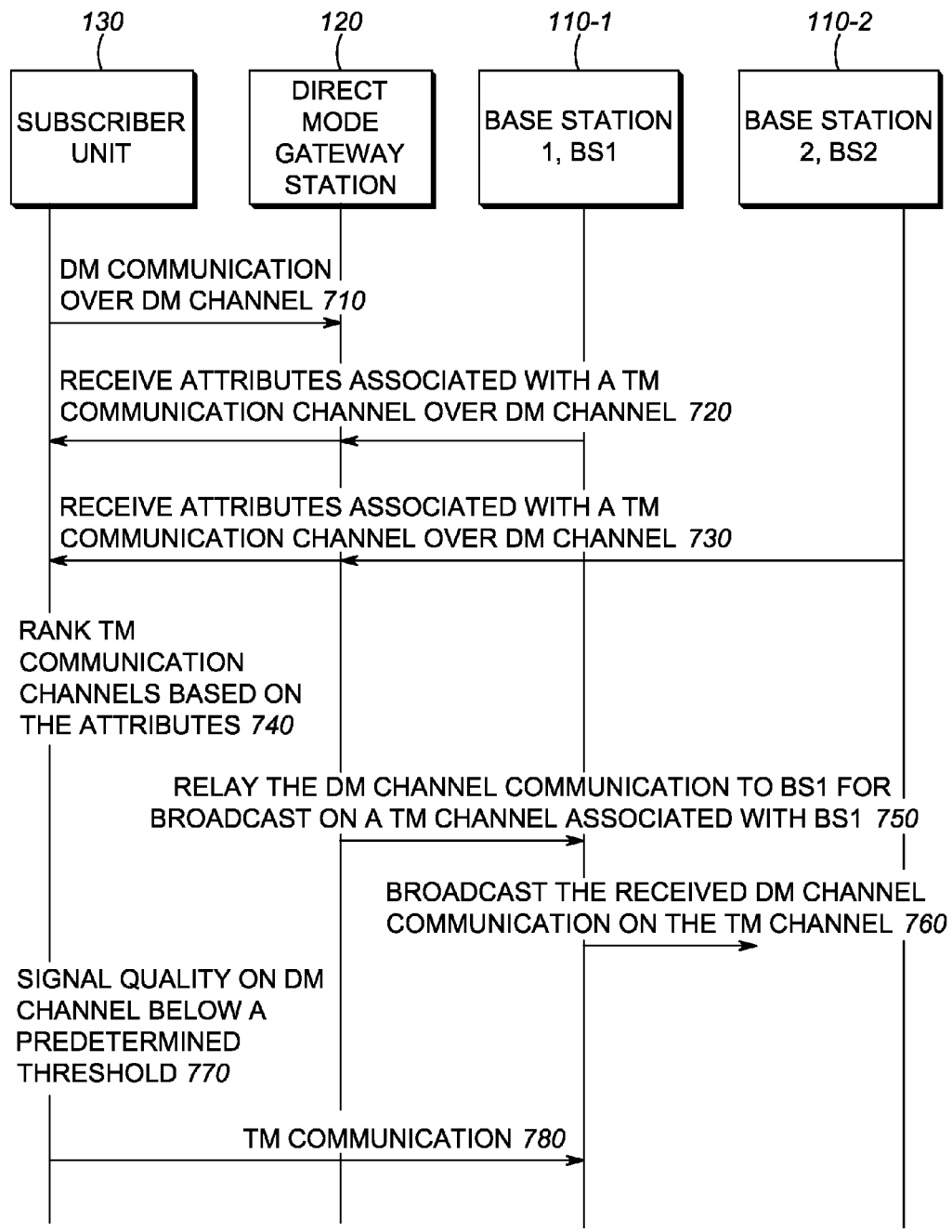
FIG. 7 illustrates an operation in the communication system of FIG. 1 for seamlessly switching from the DMO to the TMO in accordance with an embodiment of the present disclosure.

FIG. 7 illustrates a method 700 of operation in the communication system 100 of FIG. 1 for seamlessly switching from the DMO to the TMO in accordance with an embodiment of the present disclosure. FIG. 7 shows two base stations, BS1 110-1 and BS2 110-2 for purposes of explaining a specific embodiment of the present disclosure. However, the scope of the present disclosure is not limited to two base stations and there may be more or less number of base stations in various embodiments of the present disclosure. At step 710, the subscriber unit 130 communicates using the direct mode communication channel 150 in the DMO via the DM-GW station 120. At step 720, the subscriber unit 130 receives attributes associated with a first trunked mode communication channel from the DM-GW 120 over the direct mode communication channel 150. At step 730, the subscriber unit 130 receives attributes associated with a second trunked mode communication channel from the DM-GW station 120 over the direct mode communication channel 150. The DM-GW station 120 receives the attributes associated with the first trunked mode communication channel and the second trunked mode communication channel from the base stations, BS1 110-1 and BS2 110-2 respectively. The DM-GW station 120 forwards the attributes associated with the first trunked mode communication channel and the second trunked mode communication channel received from the base stations, BS1 110-1 and BS2 110-2 to the subscriber unit 130.

At step 740, the subscriber unit 130 ranks the first and the second trunked mode communication channels associated with the base stations, BS1 110-1 and BS2 110-2 respectively based on one or more parameters or information included within the attributes received from the DM-GW station 120. Thereafter, the subscriber unit 130 selects the first trunked mode communication channel associated with the base station BS1 110-1 in accordance with the ranking. In another embodiment of the present disclosure, the subscriber unit 130 selects the second trunked mode communication channel associated with the base station BS2 110-2 in accordance with the ranking. At step 750, the DM-GW station 120 relays the communication of the direct mode communication channel 150 to base station BS1 110-1 for the base station BS1 110-1 to broadcast the communication relayed to it on the first trunked mode communication channel. At step 760, the base station BS1 110-1 broadcasts the received communication on the first trunked mode communication channel even if no subscriber unit is tuned to the first trunked mode communication channel. At step 770, the subscriber unit 130 determines whether the signal quality on the direct mode communication channel 150 is below the predetermined threshold and when the signal quality on the direct mode communication channel 150 is below the predetermined threshold, at step 780, the subscriber unit 130 automatically switches to the TMO for communicating on the selected first trunked mode communication channel via the base station BS1 110-1.

One advantage of the present disclosure lies in the relaying and the consequent availability of a group communication on both the trunked mode communication channel 140 and the direct mode communication channel 150, via synchronized trunked mode communication channels 140 and direct mode communication channels 150. Further, the subscriber unit 130 is able to monitor the signal quality on a current communication channel on which it is communicating and when the signal quality is below a predetermined threshold, the subscriber unit 130 automatically switches to an alternative type of communication channel. The current communication channel and the alternative communication channel can be one of the trunked mode communication channel 140 type and the direct mode communication channel 150 type. The communication is relayed and is available on the alternative communication channel thereby enabling the subscriber unit 130 to seamlessly switch to the alternative communication channel and continue the communication on the alternative communication channel immediately after the switching.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a subscriber unit to seamlessly switch between a trunked mode operation and a direct mode operation, the method comprising at the subscriber unit:
   maintaining attributes associated with a first communication channel and a second communication channel, wherein the first communication channel is used by the subscriber unit to communicate in trunked mode operation via at least one base station and the second communication channel is used by the subscriber unit to communicate in direct mode operation with at least one direct mode gateway station that is configured to relay communications between the first communication channel and the second communication channel, wherein the attributes associated with the first communication channel used by the subscriber unit to communicate in trunked mode operation is received from the at least one direct mode gateway station when communicating using the second communication channel in the direct mode operation and the attributes associated with the second communication channel used by the subscriber unit to communicate in the direct mode operation is received from the at least one base station when communicating using the first communication channel in the trunked mode operation;
   determining, when communicating using the first communication channel in trunked mode operation, whether the signal quality on the first communication channel is below a predetermined threshold, and in response to determining that the signal quality on the first communication channel is below the predetermined threshold, using the attributes associated with the second communication channel and received from the at least one base station over the first communication channel to automatically switch to the direct mode operation for communicating on the second communication channel; and
   determining, when communicating using the second communication channel in direct mode operation, whether the signal quality on the second communication channel is below a predetermined threshold, and in response to determining that the signal quality on the second communication channel is below the predetermined threshold, using the attributes associated with the first communication channel and received from the at least one direct mode gateway over the second communication channel to automatically switch to the trunked mode operation for communicating on the first communication channel.

2. The method of claim 1, further comprising:
   receiving, by the subscriber unit, the attributes associated with the first communication channel and the second communication channel from the at least one direct mode gateway station.

3. The method of claim 1, further comprising:
   receiving attributes associated with a plurality of direct mode communication channels from a respective plurality of direct mode gateway stations through the base station, when communicating using the first communication channel in the trunked mode operation; and
   ranking the plurality of direct mode communication channels based on one or more parameters included within the attributes.

4. The method of claim 3, wherein in response to determining that the signal quality on the first communication channel is below the predetermined threshold, selecting the second communication channel from the plurality of direct mode communication channels in accordance with the ranking and automatically switching to the direct mode operation for communicating on the second communication channel via the at least one direct mode gateway station.

5. The method of claim 1, further comprising:
   receiving attributes associated with a plurality of trunked mode communication channels from the at least one direct mode gateway station, when communicating using the second communication channel in the direct mode operation; and
   ranking the plurality of trunked mode communication channels based on one or more parameters included within the attributes.

6. The method of claim 5, wherein in response to determining that the signal quality on the second communication channel is below the predetermined threshold, selecting the first communication channel from the plurality of trunked mode communication channels in accordance with the ranking and automatically switching to the trunked mode operation for communicating on the first communication channel via the at least one base station.

7. The method of claim 1, wherein the parameters included within the attributes associated with the first communication channel and the second communication channel include information about one or more of a channel frequency, a frequency range to scan, a location of a base station serving the first communication channel or a direct mode gateway station serving the second communication channel, location of cells neighboring to the base station or the direct mode gateway station, number of subscriber units affiliated with the base station or the direct mode gateway station, a talk group with which the base station or the direct mode gateway station is currently affiliated, signal quality parameters, and relevant timers and counters.

8. The method of claim 1, further comprising receiving, by the subscriber unit, a presence signal synchronization burst from the at least one direct mode gateway station when communicating using the first communication channel in trunked mode operation and using the presence signal synchronization burst to synchronize the first communication channel and the second communication channel when switching to the direct mode operation.

9. The method of claim 1, wherein the subscriber unit is a dual watch capable radio comprising two transceivers, the method further comprising:
tuning a first transceiver of the two transceivers to one of the first communication channel and the second communication channel; and
tuning a second transceiver of the two transceivers to the other one of the first communication channel and the second communication channel or operating the second transceiver of the two transceivers to scan available channels based on the attributes received over the one of the first communication channel and the second communication channel.

10. The method of claim 1, further comprising:
receiving the attributes associated with the second communication channel over the first communication channel, the attributes associated with the second communication channel including at least a channel frequency on the second communication channel; and
receiving the attributes associated with the first communication channel over the second communication channel, the attributes associated with the first communication channel including at least a channel frequency on the first communication channel.

11. A subscriber unit for seamlessly switching between a trunked mode operation and a direct mode operation, the subscriber unit comprising:
a transceiver operated to communicate on a first communication channel in trunked mode operation via at least one base station and on a second communication channel in direct mode operation with at least one direct mode gateway station that is configured to relay communications between the first communication channel and the second communication channel;
a memory operated to maintain attributes associated with the first communication channel and the second communication channel; and
a processor coupled to the transceiver and the memory, the processor configured to:
receive, via the transceiver, attributes associated with the first communication channel used by the subscriber unit to communicate in trunked mode operation from the at least one direct mode gateway when communicating using the second communication channel in the direct mode operation and the attributes associated with the second communication channel used by the subscriber unit to communicate in the direct mode operation from the at least one base station when communicating using the first communication channel in the trunked mode operation;
determine, via the transceiver, when communicating using the first communication channel in trunked mode operation, whether the signal quality on the first communication channel is below a predetermined threshold, and in response to determining that the signal quality on the first communication channel is below the predetermined threshold, use the attributes associated with the second communication channel and received from the at least one base station over the first communication channel to automatically switch the transceiver to the direct mode operation for communicating on the second communication channel; and
determine, via the transceiver, when communicating using the second communication channel in direct mode operation, whether the signal quality on the second communication channel is below a predetermined threshold, and in response to determining that the signal quality on the second communication channel is below the predetermined threshold, use the attributes associated with the first communication channel and received from the at least one direct mode gateway over the second communication channel to automatically switch the transceiver to the trunked mode operation for communicating on the first communication channel.

12. The subscriber unit of claim 11, wherein the processor is configured to receive, via the transceiver, the attributes associated with the first communication channel and the second communication channel from the at least one direct mode gateway station.

13. The subscriber unit of claim 11, wherein:
the processor is further configured to receive, via the transceiver, attributes associated with a plurality of direct mode communication channels from a respective plurality of direct mode gateway stations through the base station, when communicating using the first communication channel in the trunked mode operation; and
the processor is further configured to rank the plurality of direct mode communication channels based on one or more parameters included within the attributes.

14. The subscriber unit of claim 13, wherein the processor is further configured to, in response to determining that the signal quality on the first communication channel is below the predetermined threshold, select the second communication channel from the plurality of direct mode communication channels in accordance with the ranking to automatically switch the transceiver to the direct mode operation for communicating on the second communication channel via the at least one direct mode gateway station.

15. The subscriber unit of claim 11, wherein:
the processor is further configured to receive, via the transceiver, attributes associated with a plurality of trunked mode communication channels from the at least one direct mode gateway station, when communicating using the second communication channel in the direct mode operation; and
the processor is further configured to rank the plurality of trunked mode communication channels based on one or more parameters included within the attributes.

16. The subscriber unit of claim 15, wherein the processor is further configured to, in response to determining that the signal quality on the second communication channel is below the predetermined threshold, select the first communication channel from the plurality of trunked mode communication channels in accordance with the ranking to automatically switch the transceiver to the trunked mode operation for communicating on the first communication channel via the at least one base station.

17. The subscriber unit of claim 11, wherein the parameters included within the attributes associated with the first communication channel and the second communication channel include at least a channel frequency.

18. The subscriber unit of claim 11, wherein the processor is further configured to receive, via the transceiver, a presence signal synchronization burst from the at least one direct mode gateway station when communicating using the first communication channel in trunked mode operation and use the presence signal synchronization burst to synchronize, via the transceiver, the first communication channel and the second communication channel when switching to the direct mode operation.

19. The subscriber unit of claim 11, wherein the subscriber unit is a dual watch capable radio comprising two transceivers, further wherein a first transceiver of the two transceivers is tuned to one of the first communication channel and the second communication channel, and a second transceiver of the two transceivers is either tuned to the other one of the first communication channel and the second communication channel or operated to scan available channels based on the attributes received over the one of the first communication channel and the second communication channel.

20. A system for operating a subscriber unit to seamlessly switch between a trunked mode operation and a direct mode operation, the system comprising:
  one or more subscriber units;
  a base station for providing trunked mode communications between the one or more subscriber units operating in trunked mode operation using a first communication channel; and
  a direct mode gateway station for providing direct mode communications between the one or more subscriber units operating in direct mode operation using a second communication channel that is configured to relay communications between the first communication channel and the second communication channel,
  wherein when the one or more subscriber units communicate using the first communication channel in the trunked mode operation, the one or more subscriber units determine whether the signal quality on the first communication channel is below a predetermined threshold, and in response to determining that the signal quality on the first communication channel is below the predetermined threshold, the one or more subscriber units use the attributes associated with the second communication channel to automatically switch to the direct mode operation for communicating on the second communication channel; and
  wherein when the one or more subscriber units communicate using the second communication channel in the direct mode operation, the one or more subscriber units determine whether the signal quality on the second communication channel is below a predetermined threshold, and in response to determining that the signal quality on the second communication channel is below the predetermined threshold, the one or more subscriber units use the attributes associated with the first communication channel to automatically switch to the trunked mode operation for communicating on the first communication channel, wherein the attributes associated with the first communication channel used by the one or more subscriber units to communicate in trunked mode operation is received from the at least one direct mode gateway station when communicating using the second communication channel in the direct mode operation and the attributes associated with the second communication channel used by the one or more subscriber units to communicate in the direct mode operation is received from the at least one base station when communicating using the first communication channel in the trunked mode operation.

* * * * *